US010059168B2

(12) United States Patent
Suzuki et al.

(10) Patent No.: US 10,059,168 B2
(45) Date of Patent: Aug. 28, 2018

(54) VEHICLE AIR CONDITIONER DEVICE

(71) Applicant: SANDEN HOLDINGS CORPORATION, Gunma (JP)

(72) Inventors: Kenichi Suzuki, Gunma (JP); Ryo Miyakoshi, Gunma (JP); Kouhei Yamashita, Gunma (JP)

(73) Assignee: Sanden Holdings Corporation, Isesaki-shi, Gunma (JP)

( * ) Notice: Subject to any disclaimer, the term of this patent is extended or adjusted under 35 U.S.C. 154(b) by 0 days.

(21) Appl. No.: 15/512,409

(22) PCT Filed: Sep. 18, 2015

(86) PCT No.: PCT/JP2015/076665
§ 371 (c)(1),
(2) Date: Mar. 17, 2017

(87) PCT Pub. No.: WO2016/043309
PCT Pub. Date: Mar. 24, 2016

(65) Prior Publication Data
US 2017/0274733 A1 Sep. 28, 2017

(30) Foreign Application Priority Data
Sep. 19, 2014 (JP) ................. 2014-191139

(51) Int. Cl.
F24H 3/06 (2006.01)
B60H 1/00 (2006.01)
(Continued)

(52) U.S. Cl.
CPC ..... B60H 1/00978 (2013.01); B60H 1/00921 (2013.01); B60H 1/2221 (2013.01);
(Continued)

(58) Field of Classification Search
CPC ............ B60H 1/00978; B60H 1/00921; B60H 1/2221; B60H 3/024; B60H 2001/00928;
(Continued)

(56) References Cited

U.S. PATENT DOCUMENTS 3,540,526 A * 11/1970 Kautz .................. F24F 3/00
165/216
2010/0070907 A1* 3/2010 Harrod ................ G05B 19/042
715/772
2013/0098085 A1* 4/2013 Judge ................ H05K 7/20827
62/180

FOREIGN PATENT DOCUMENTS

JP 2011-005981 A 1/2011
JP 2011-031704 A 2/2011
(Continued)

OTHER PUBLICATIONS

Japan Patent Office, International Search Report issued in International Application No. PCT/JP2015/076665, dated Dec. 28, 2015.

Primary Examiner — Davis Hwu
(74) Attorney, Agent, or Firm — Baker Botts L.L.P.

(57) ABSTRACT

There is disclosed a vehicle air conditioner device which is capable of continuing an air conditioning operation also in a case where a disconnection failure occurs in a solenoid valve to change a flow of a refrigerant in each operation mode. Respective solenoid valves 17, 20, 21 and 22 to change the respective operation modes of a vehicle air conditioner device 1 are constituted so that the flow of the refrigerant changes to a cooling mode when all the solenoid valves 17, 20, 21 and 22 are non-energized. The vehicle air conditioner device executes a cooling mode during failure in which a controller adjusts all the solenoid valves 17, 20, 21 and 22 to be non-energized and operates a compressor 2, in (Continued)

a case where the disconnection failure occurs in one of the solenoid valves 17, 20, 21 and 22.

8 Claims, 9 Drawing Sheets

(51) Int. Cl.
 *B60H 1/22* (2006.01)
 *B60H 3/02* (2006.01)
(52) U.S. Cl.
 CPC ... *B60H 3/024* (2013.01); *B60H 2001/00928* (2013.01); *B60H 2001/00949* (2013.01); *B60H 2001/00957* (2013.01)
(58) Field of Classification Search
 CPC . B60H 2001/00949; B60H 2001/00957; F24F 3/00; H05K 7/20827
 USPC ........................................................ 165/122
 See application file for complete search history.

(56) References Cited

FOREIGN PATENT DOCUMENTS

| | | |
|---|---|---|
| JP | 2012-148736 A | 8/2012 |
| JP | 2012-250708 A | 12/2012 |
| JP | 2014-094671 A | 5/2014 |

* cited by examiner

FIG. 3

| OPERATION MODE | HEATING | DEHUMIDIFYING | | | COOLING |
|---|---|---|---|---|---|
| | | DEHUMIDIFYING AND HEATING | INTERNAL CYCLE | DEHUMIDIFYING AND COOLING | |
| SOLENOID VALVE 17 (COOLING) | CLOSED (ENERGIZED) | CLOSED (ENERGIZED) | CLOSED (ENERGIZED) | OPENED (NON-ENERGIZED) | OPENED (NON-ENERGIZED) |
| SOLENOID VALVE 20 (BYPASS) | CLOSED (ENERGIZED) | CLOSED (ENERGIZED) | CLOSED (ENERGIZED) | CLOSED (ENERGIZED) | OPENED (NON-ENERGIZED) |
| SOLENOID VALVE 21 (HEATING) | OPENED (ENERGIZED) | OPENED (ENERGIZED) | CLOSED (NON-ENERGIZED) | CLOSED (NON-ENERGIZED) | CLOSED (NON-ENERGIZED) |
| SOLENOID VALVE 22 (DEHUMIDIFYING) | CLOSED (NON-ENERGIZED) | OPENED (ENERGIZED) | OPENED (ENERGIZED) | CLOSED (NON-ENERGIZED) | CLOSED (NON-ENERGIZED) | ic conditioner device of a heat pump system which conditions air in a vehicle interior.

VEHICLE AIR CONDITIONER DEVICE

CROSS-REFERENCE TO RELATED APPLICATIONS

This application is a U.S. National Stage Patent Application under 37 U.S.C. § 371 of International Patent Application No. PCT/JP2015/076665, filed on Sep. 18, 2015, which claims the benefit of Japanese Patent Application No. JP 2014-191139, filed on Sep. 19, 2014, the disclosures of each of which are incorporated herein by reference in their entirety.

TECHNICAL FIELD

The present invention relates to an air conditioner device of a heat pump system which conditions air in a vehicle interior.

BACKGROUND ART

Due to actualization of environmental problems in recent years, hybrid cars and electric cars have spread. Further, as an air conditioner device which is applicable to such a vehicle, there has been developed an air conditioner device which includes an electric compressor to compress and discharge a refrigerant, a radiator (a condenser) disposed on a vehicle interior side to let the refrigerant radiate heat, a heat absorber (an evaporator) disposed on the vehicle interior side to let the refrigerant absorb heat, and an outdoor heat exchanger disposed outside a vehicle interior to let the refrigerant radiate or absorb heat, and which changes and executes respective operation modes of a heating mode to let the refrigerant discharged from the compressor radiate heat in the radiator and let the refrigerant by which heat has been radiated in this radiator absorb heat in the outdoor heat exchanger, a dehumidifying mode to let the refrigerant discharged from the compressor radiate heat in the radiator and let the refrigerant by which heat has been radiated in the radiator absorb heat in the heat absorber, and a cooling mode to let the refrigerant discharged from the compressor radiate heat in the outdoor heat exchanger and let the refrigerant absorb heat in the heat absorber.

Furthermore, a plurality of solenoid valves are used, and a coil of each solenoid valve is energized or non-energized to change an opened/closed state in each of the operation modes, thereby controlling the flow of the refrigerant in each operation mode (e.g., see Patent Document 1).

CITATION LIST

Patent Documents

Patent Document 1: Japanese Patent Application Publication No. 2012-250708

SUMMARY OF THE INVENTION

Problems to be Solved by the Invention

In consideration of durability of coils of respective solenoid valves in such an air conditioner device as described above, it is preferable that a voltage is not applied in an environment (a high outdoor air temperature environment in summer or the like) where an ambient temperature of the solenoid valves is high. Furthermore, during stop of a vehicle, each solenoid valve is non-energized, but it is also presumed that during such stop, a refrigerant in a refrigerant circuit or oil unintentionally moves, and hence the problem that reliability on re-startup is impaired also occurs depending on an opened/closed state of each solenoid valve during the non-energization.

In Patent Document 1 mentioned above, during the non-energization of each solenoid valve, a flow of a refrigerant in a cooling mode is constituted, and hence it is possible to solve such a problem as described above. However, in a case where a disconnection failure occurs in one of the coils of the solenoid valves, the flow of the refrigerant becomes uncontrollable. Such disconnection failure is detectable with a controller, and hence the air conditioner device has heretofore become inoperable in a case where the controller detects this failure.

The present invention has been developed to solve such a conventional technical problem, and an object thereof is to provide a vehicle air conditioner device which is capable of continuing an air conditioning operation also in a case where a disconnection failure occurs in a solenoid valve to change a flow of a refrigerant in each operation mode.

Means for Solving the Problems

A vehicle air conditioner device of the present invention includes a compressor which compresses a refrigerant, an air flow passage through which air to be supplied to a vehicle interior flows, a radiator which lets the refrigerant radiate heat to heat the air to be supplied from the air flow passage to the vehicle interior, a heat absorber which lets the refrigerant absorb heat to cool the air to be supplied from the air flow passage to the vehicle interior, an outdoor heat exchanger disposed outside the vehicle interior to let the refrigerant radiate or absorb heat, a plurality of solenoid valves to change a flow of the refrigerant, auxiliary heating means for heating the air to be supplied from the air flow passage to the vehicle interior, and control means, the vehicle air conditioner device controls the solenoid valves by this control means, thereby changing and executing a heating mode in which the control means lets the refrigerant discharged from the compressor radiate heat in the radiator, decompresses the refrigerant by which heat has been radiated, and then lets the refrigerant absorb heat in the outdoor heat exchanger, a dehumidifying mode in which the control means lets the refrigerant discharged from the compressor radiate heat in the radiator, decompresses the refrigerant by which heat has been radiated, and then lets the refrigerant absorb heat in the heat absorber, and a cooling mode in which the control means lets the refrigerant discharged from the compressor radiate heat in the outdoor heat exchanger, decompresses the refrigerant by which heat has been radiated, and then lets the refrigerant absorb heat in the heat absorber, and the vehicle air conditioner device is characterized in that the respective solenoid valves are constituted so that the flow of the refrigerant changes to the cooling mode when all the solenoid valves are non-energized, and the control means executes a cooling mode during failure in which the control means adjusts all the solenoid valves to be non-energized and operates the compressor, in a case where a disconnection failure occurs in one of the solenoid valves.

The vehicle air conditioner device of the invention of claim 2 is characterized in that the vehicle air conditioner device of the above invention the control means executes a dehumidifying mode during failure in which the control means adjusts all the solenoid valves to be non-energized, operates the compressor, and generates heat in the auxiliary heating means to heat the air to be supplied to the vehicle interior, in the case where the disconnection failure occurs in one of the solenoid valves.

The vehicle air conditioner device of the invention of claim 3 is characterized in that the vehicle air conditioner device of the above invention the control means executes a heating mode during failure in which the control means stops the operation of the compressor to heat the air to be supplied to the vehicle interior by heat generation of the auxiliary heating means, in the case where the disconnection failure occurs in one of the solenoid valves.

The vehicle air conditioner device of the invention of claim 4 is characterized in that the vehicle air conditioner device in the above respective inventions includes an accumulator disposed on a refrigerant suction side of the compressor, and the solenoid valve for heating which is positioned between an outlet of the outdoor heat exchanger and an inlet of the accumulator, and this solenoid valve for heating closes in a non-energized state.

The vehicle air conditioner device of the invention of claim 5 is characterized in that the vehicle air conditioner device in the above respective inventions includes the solenoid valve for dehumidifying which is connected in parallel with the outdoor heat exchanger, and the control means closes the solenoid valve for dehumidifying in the heating mode and the control means performs dehumidifying and heating by opening the solenoid valve for dehumidifying in the dehumidifying mode to let the refrigerant discharged from the compressor radiate heat in the radiator, decompresses the refrigerant by which heat has been radiated, and then lets the refrigerant absorb heat in the heat absorber and the outdoor heat exchanger, and the solenoid valve for dehumidifying closes in a non-energized state.

The vehicle air conditioner device of the invention of claim 6 is characterized in that the vehicle air conditioner device in the above respective inventions includes a heating medium circulating circuit which has a heating medium-air heat exchanger, an electric heater and circulating means and circulates a heating medium heated by the electric heater through the heating medium-air heat exchanger by the circulating means, and the auxiliary heating means is constituted of the heating medium-air heat exchanger.

The vehicle air conditioner device of the invention of claim 7 is characterized in that in the inventions of claim 1 to claim 5, the auxiliary heating means is constituted of an electric heater.

The vehicle air conditioner device of the invention of claim 8 is characterized in that in the inventions of claim 1 to claim 5, the radiator is disposed outside the air flow passage, and the auxiliary heating means is constituted of a heating medium circulating circuit which has a heating medium-refrigerant heat exchanger to perform heat exchange with this radiator, a heating medium-air heat exchanger disposed in the air flow passage, an electric heater and circulating means and circulates a heating medium heated by the heating medium-refrigerant heat exchanger and/or the electric heater through the heating medium-air heat exchanger by the circulating means.

Advantageous Effect of the Invention

According to the present invention, a vehicle air conditioner device includes a compressor which compresses a refrigerant, an air flow passage through which air to be supplied to a vehicle interior flows, a radiator which lets the refrigerant radiate heat to heat the air to be supplied from the air flow passage to the vehicle interior, a heat absorber which lets the refrigerant absorb heat to cool the air to be supplied from the air flow passage to the vehicle interior, an outdoor heat exchanger disposed outside the vehicle interior to let the refrigerant radiate or absorb heat, a plurality of solenoid valves to change a flow of the refrigerant, auxiliary heating means for heating the air to be supplied from the air flow passage to the vehicle interior, and control means, the vehicle air conditioner device controls the solenoid valves by this control means, thereby changing and executing a heating mode in which the control means lets the refrigerant discharged from the compressor radiate heat in the radiator, decompresses the refrigerant by which heat has been radiated, and then lets the refrigerant absorb heat in the outdoor heat exchanger, a dehumidifying mode in which the control means lets the refrigerant discharged from the compressor radiate heat in the radiator, decompresses the refrigerant by which heat has been radiated, and then lets the refrigerant absorb heat in the heat absorber, and a cooling mode in which the control means lets the refrigerant discharged from the compressor radiate heat in the outdoor heat exchanger, decompresses the refrigerant by which heat has been radiated, and then lets the refrigerant absorb heat in the heat absorber, and the vehicle air conditioner device is characterized in that the respective solenoid valves are constituted so that the flow of the refrigerant changes to the cooling mode when all the solenoid valves are non-energized. Therefore, in the cooling mode to be executed in an environment where durability of coils of the solenoid valves is feared, i.e., in a high outdoor air temperature environment such as summer where an ambient temperature of the solenoid valves rises, the respective solenoid valves are non-energized. Consequently, it is possible to inhibit the disadvantage that the solenoid valves deteriorate due to temperature rise accompanying heat generation of the coils and to improve reliability.

Especially, the control means executes a cooling mode during failure in which the control means adjusts all the solenoid valves to be non-energized and operates the compressor, in a case where disconnection failure occurs in one of the solenoid valves. Therefore, also in the case where the disconnection failure occurs in one of the solenoid valves, it is possible to continue an air conditioning operation (the cooling mode during failure) in which the control means changes the flow of the refrigerant to the cooling mode and operates the compressor, thereby cooling the vehicle interior, and it is possible to achieve such comfortable vehicle interior cooling during the failure.

Furthermore, according to the invention of claim 2, in addition to the above invention, the control means executes a dehumidifying mode during failure in which the control means adjusts all the solenoid valves to be non-energized, operates the compressor, and generates heat in the auxiliary heating means to heat the air to be supplied to the vehicle interior, in the case where the disconnection failure occurs in one of the solenoid valves. Therefore, also in the case where the disconnection failure occurs in one of the solenoid valves, it is possible to continue an air conditioning operation (the dehumidifying mode during failure) in which the control means changes the flow of the refrigerant to the cooling mode to operate the compressor, lets the refrigerant absorb heat in the heat absorber and heats the air to be supplied to the vehicle interior by the auxiliary heating means, thereby dehumidifying the vehicle interior, and it is possible to achieve such comfortable vehicle interior dehumidifying during the failure.

Furthermore, according to the invention of claim 3, in addition to the above respective inventions, the control means executes a heating mode during failure in which the control means stops the operation of the compressor to heat the air to be supplied to the vehicle interior by heat generation of the auxiliary heating means, in the case where the disconnection failure occurs in one of the solenoid valves. Therefore, also in the case where the disconnection failure occurs in one of the solenoid valves, it is possible to continue an air conditioning operation (the heating mode during failure) in which the control means stops the operation of the compressor and additionally the auxiliary heating means heats the air to be supplied to the vehicle interior, thereby heating the vehicle interior, and it is possible to achieve such comfortable vehicle interior heating during the failure.

In this case, as in the invention of claim 4, there are provided an accumulator disposed on a refrigerant suction side of the compressor, and a solenoid valve for heating which is positioned between an outlet of the outdoor heat exchanger and an inlet of the accumulator, and in this case, this solenoid valve for heating is constituted to close in the non-energized state. Consequently, while the vehicle air conditioner device stops, the solenoid valve for heating inhibits the refrigerant or oil from moving from the outdoor heat exchanger to the accumulator, and reliability on re-startup can improve.

Furthermore, as in the invention of claim 5, the vehicle air conditioner device includes a solenoid valve for dehumidifying which is connected in parallel with the outdoor heat exchanger, and the control means closes the solenoid valve for dehumidifying in the heating mode and the control means performs dehumidifying and heating by opening the solenoid valve for dehumidifying in the dehumidifying mode to let the refrigerant discharged from the compressor radiate heat in the radiator, decompresses the refrigerant by which heat has been radiated, and then lets the refrigerant absorb heat in the heat absorber and the outdoor heat exchanger. In this case, the solenoid valve for dehumidifying is constituted to close in the non-energized state.

Consequently, when the vehicle air conditioner device executing the heating mode stops, the solenoid valve for dehumidifying does not open.

Here, in the heating mode, a pressure difference before and after the solenoid valve for dehumidifying increases, but the solenoid valve for dehumidifying is prevented from opening during the stop, so that it is possible to avoid, in advance, the disadvantage that noise is generated in the solenoid valve for dehumidifying when the vehicle air conditioner device stops.

It is to be noted that as in the invention of claim 6, there is provided a heating medium circulating circuit which has a heating medium-air heat exchanger, an electric heater and circulating means and circulates a heating medium heated by the electric heater through the heating medium-air heat exchanger by the circulating means, and the auxiliary heating means is constituted of the heating medium-air heat exchanger, so that it is possible to achieve electrically safe vehicle interior heating.

On the other hand, when the auxiliary heating means is constituted of the electric heater as in the invention of claim 7, simplification of a structure can be achieved.

Furthermore, as in the invention of claim 8, the radiator is disposed outside the air flow passage, and the auxiliary heating means is constituted of a heating medium circulating circuit which has a heating medium-refrigerant heat exchanger to perform heat exchange with this radiator, a heating medium-air heat exchanger disposed in the air flow passage, an electric heater and circulating means and circulates a heating medium heated by the heating medium-refrigerant heat exchanger and/or the electric heater through the heating medium-air heat exchanger by the circulating means. Also in this case, an electric safety can improve.

BRIEF DESCRIPTION OF THE DRAWINGS

FIG. 3 is a view to explain opening/closing and an energized state of solenoid valves in respective operation modes of the vehicle air conditioner device of FIG. 1;

MODE FOR CARRYING OUT THE INVENTION

Hereinafter, embodiments of the present invention will be described in detail with reference to the drawings.

Figure 1:
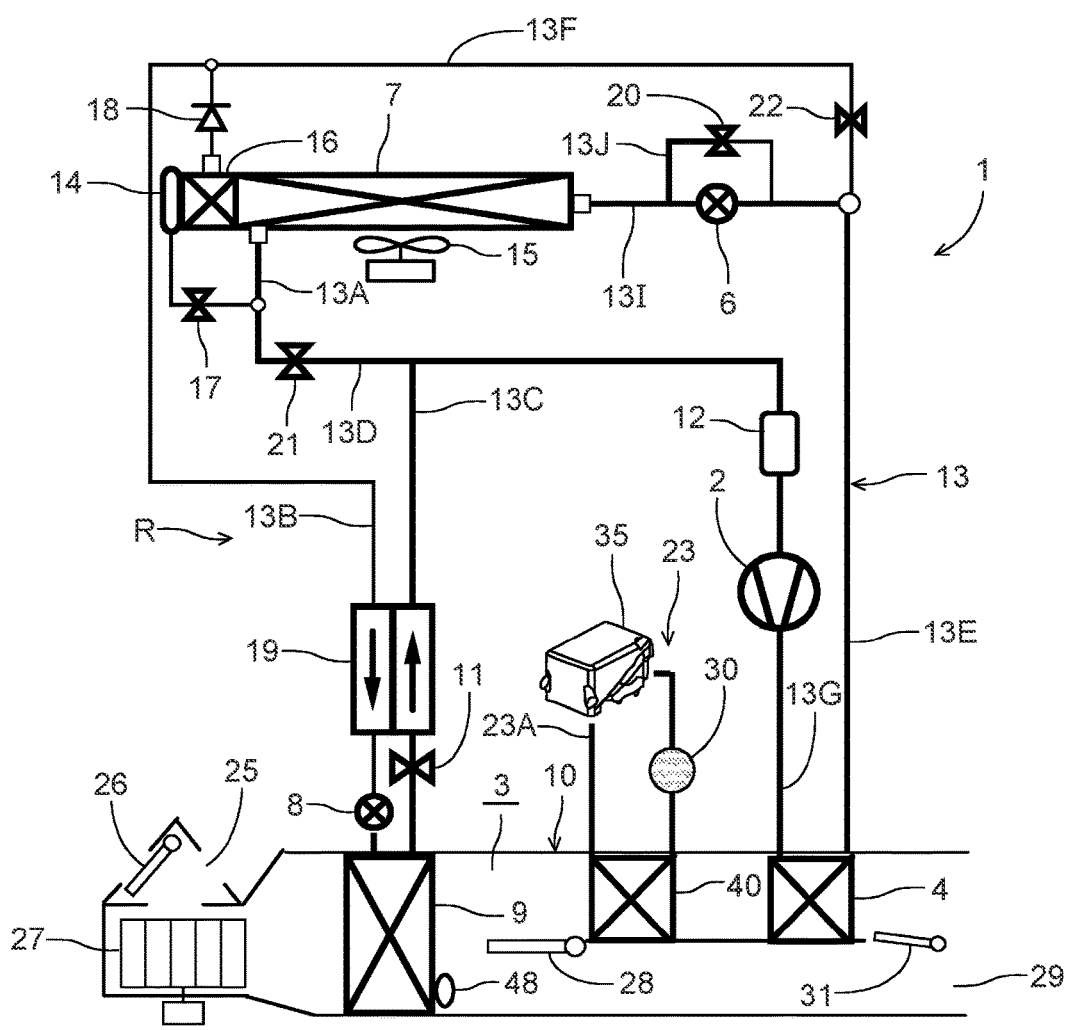
FIG. 1 is a constitutional view of a vehicle air conditioner device of one embodiment to which the present invention is applied.

FIG. 1 shows a constitutional view of a vehicle air conditioner device 1 of one embodiment of the present invention. A vehicle of the embodiment to which the present invention is applied is an electric car (EV) in which an engine (an internal combustion engine) is not mounted and which runs by driving an electric motor for running with power charged in a battery (which is not shown in the drawing), and the vehicle air conditioner device 1 of the present invention is also driven with the power of the battery. That is, the vehicle air conditioner device 1 of the embodiment performs heating by a heat pump operation using a refrigerant circuit in the electric car in which it is not possible to perform heating by engine waste heat, and further, the vehicle air conditioner device selectively executes respective operation modes of dehumidifying and heating, an internal cycle, dehumidifying and cooling, and cooling.

It is to be noted that the vehicle is not limited to the electric car, and the present invention is also effective for a so-called hybrid car using the engine together with the electric motor for running, and furthermore, needless to say, the present invention is also applicable to a usual car which runs with the engine.

The vehicle air conditioner device 1 of the embodiment performs air conditioning (heating, cooling, dehumidifying, and ventilation) of a vehicle interior of the electric car, and there are successively connected, by a refrigerant pipe 13, an electric type of compressor 2 which compresses a refrigerant, a radiator 4 disposed in an air flow passage 3 of an HVAC unit 10 in which vehicle interior air passes and circulates, to let the high-temperature high-pressure refrigerant discharged from the compressor 2 flow inside via a refrigerant pipe 13G and to let this refrigerant radiate heat in the vehicle interior, an outdoor expansion valve 6 constituted of an electric valve which decompresses and expands the refrigerant during the heating, an outdoor heat exchanger 7 which performs heat exchange between the refrigerant and outdoor air to function as the radiator during the cooling and to function as an evaporator during the heating, an indoor expansion valve 8 constituted of an electric valve which decompresses and expands the refrigerant, a heat absorber 9 disposed in the air flow passage 3 to let the refrigerant absorb heat from interior and exterior of the vehicle during the cooling and during the dehumidifying, an evaporation capability control valve 11 which adjusts an evaporation capability in the heat absorber 9, an accumulator 12 and the like, thereby constituting a refrigerant circuit R.

It is to be noted that in the outdoor heat exchanger 7, an outdoor blower 15 is disposed. The outdoor blower 15 is constituted to forcibly blow the outdoor air through the outdoor heat exchanger 7, thereby performing heat exchange between the outdoor air and the refrigerant, and consequently, the outdoor blower blows the outdoor air through the outdoor heat exchanger 7 also during stop (i.e., a velocity is 0 km/h).

Furthermore, the outdoor heat exchanger 7 has a receiver drier portion 14 and a subcooling portion 16 successively on a refrigerant downstream side, a refrigerant pipe 13A extending out from the outdoor heat exchanger 7 is connected to the receiver drier portion 14 via a solenoid valve (a solenoid valve for cooling) 17 opened during the cooling, and an outlet of the subcooling portion 16 is connected to the indoor expansion valve 8 via a check valve 18. It is to be noted that the receiver drier portion 14 and the subcooling portion 16 structurally constitute a part of the outdoor heat exchanger 7, and an indoor expansion valve 8 side of the check valve 18 is a forward direction.

Furthermore, a refrigerant pipe 13B between the check valve 18 and the indoor expansion valve 8 is disposed in a heat exchange relation with a refrigerant pipe 13C extending out from the evaporation capability control valve 11 positioned on an outlet side of the heat absorber 9, and both the pipes constitute an internal heat exchanger 19. In consequence, the refrigerant flowing into the indoor expansion valve 8 through the refrigerant pipe 13B is cooled (subcooled) by the low-temperature refrigerant flowing out from the heat absorber 9 through the evaporation capability control valve 11.

Furthermore, the refrigerant pipe 13A extending out from the outdoor heat exchanger 7 branches, and this branching refrigerant pipe 13D communicates and connects with the refrigerant pipe 13C on a downstream side of the internal heat exchanger 19 via a solenoid valve 21 (a solenoid valve for heating) to be opened during the heating. The refrigerant pipe 13C is connected to the accumulator 12 and the accumulator 12 is connected to a refrigerant suction side of the compressor 2. That is, the solenoid valve 21 for heating is positioned between an outlet of the outdoor heat exchanger 7 (in a heating, dehumidifying and heating, or internal cycle mode) and an inlet of the accumulator 12.

Furthermore, a refrigerant pipe 13E on an outlet side of the radiator 4 branches before the outdoor expansion valve 6, and this branching refrigerant pipe 13F communicates and connects with the refrigerant pipe 13B on a downstream side of the check valve 18 via a solenoid valve (a solenoid valve for dehumidifying) 22 to be opened during the dehumidifying. That is, the solenoid valve 22 for dehumidifying is connected in parallel with the outdoor heat exchanger 7 (and the outdoor expansion valve 6, etc.).

Furthermore, the outdoor expansion valve 6 is connected in parallel with a bypass pipe 13J, and in the bypass pipe 13J, a solenoid valve (a solenoid valve for bypass) 20 is interposed to open in a cooling mode so that the refrigerant bypasses the outdoor expansion valve 6 to flow. It is to be noted that a pipe between the outdoor expansion valve 6 and the solenoid valve 20 and the outdoor heat exchanger 7 is denoted with 131.

Furthermore, in the air flow passage 3 on an air upstream side of the heat absorber 9, respective suction ports such as an outdoor air suction port and an indoor air suction port are formed (represented by a suction port 25 in FIG. 1), and in the suction port 25, a suction changing damper 26 is disposed to change the air to be introduced into the air flow passage 3 to indoor air which is air in the vehicle interior (an indoor air circulating mode) and outdoor air which is air outside the vehicle interior (an outdoor air introducing mode). Furthermore, on an air downstream side of the suction changing damper 26, an indoor blower (a blower fan) 27 is disposed to supply the introduced indoor air or outdoor air to the air flow passage 3.

Furthermore, in FIG. 1, reference numeral 23 indicates a heating medium circulating circuit disposed in the vehicle air conditioner device 1 of the embodiment. The heating medium circulating circuit 23 includes a circulating pump 30 constituting circulating means, a heating medium heating electric heater 35, and a heating medium-air heat exchanger (auxiliary heating means in the present invention) disposed in the air flow passage 3 on an air upstream side of the radiator 4 to the flow of the air of the air flow passage 3, and these components are successively annularly connected to one another by a heating medium pipe 23A. It is to be noted that as the heating medium to circulate in the heating medium circulating circuit 23, for example, water, a refrigerant such as HFO-1234yf, a coolant or the like is employed.

Further, when the circulating pump 30 is operated and the heating medium heating electric heater 35 is energized to generate heat, the heating medium heated by the heating medium heating electric heater 35 circulates through the heating medium-air heat exchanger 40. That is, the heating medium-air heat exchanger 40 of the heating medium circulating circuit 23 becomes a so-called heater core, and complements the heating of the vehicle interior. The employing of the heating medium circulating circuit 23 can improve electric safety of a passenger.

Furthermore, in the air flow passage 3 on the air upstream side of the heating medium-air heat exchanger 40, an air mix damper 28 is disposed to adjust a degree at which indoor air or outdoor air is passed through the radiator 4. Furthermore, in the air flow passage 3 on the air downstream side of the radiator 4, there is formed each outlet (represented by an outlet 29 in FIG. 1) of foot, vent or defroster, and in the outlet 29, an outlet changing damper 31 is disposed to execute changing control of blowing of the air from each outlet mentioned above.

Figure 2:
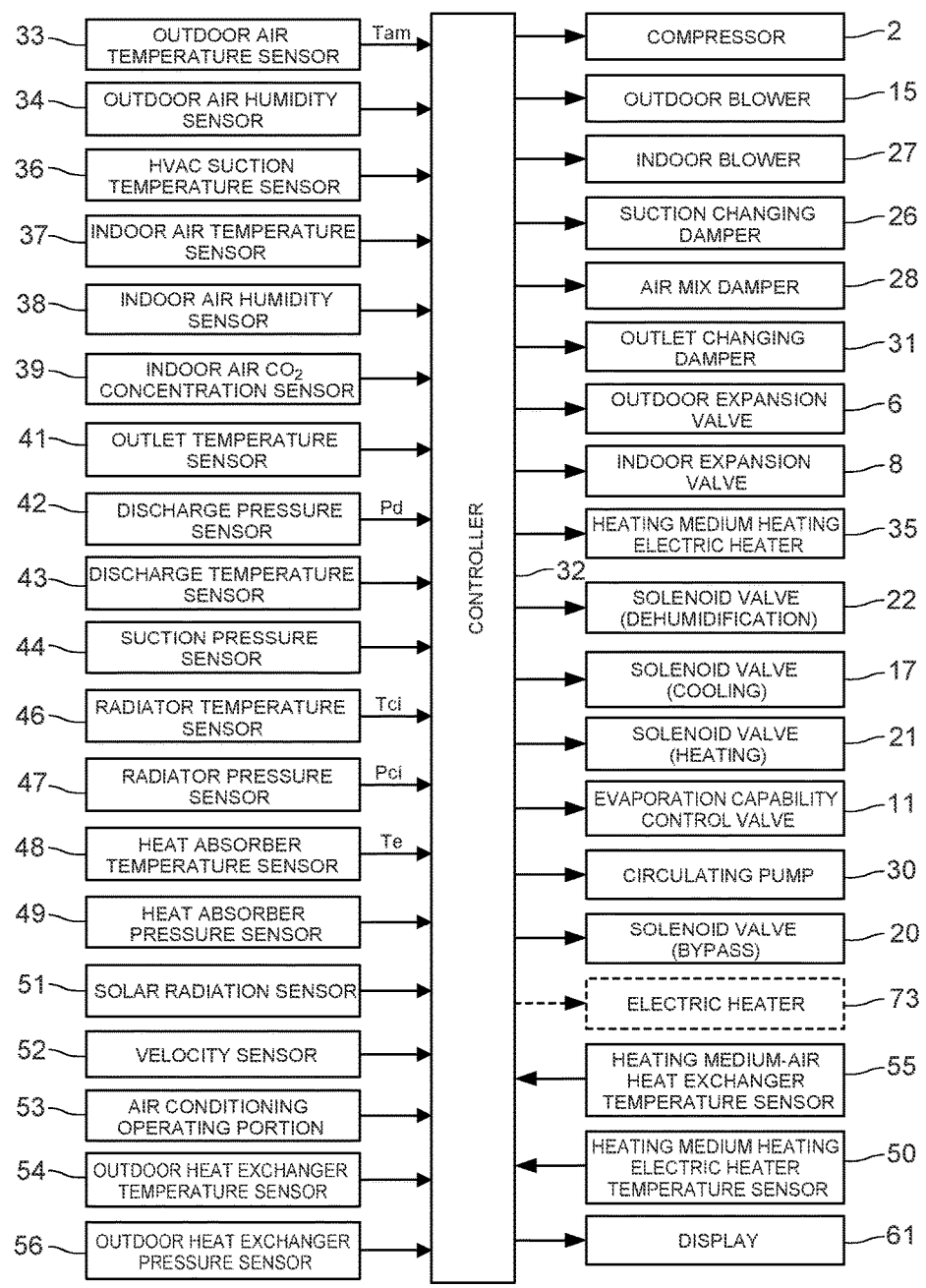
FIG. 2 is a block diagram of an electric circuit of a controller of the vehicle air conditioner device of FIG. 1.

Next, in FIG. 2, 32 is a controller (ECU) as control means constituted of a microcomputer, and an input of the controller 32 is connected to respective outputs of an outdoor air temperature sensor 33 which detects an outdoor air temperature of the vehicle, an outdoor air humidity sensor 34 which detects an outdoor air humidity, an HVAC suction temperature sensor 36 which detects a temperature of the air to be sucked from the suction port 25 to the air flow passage 3, an indoor air temperature sensor 37 which detects a temperature of the air of the vehicle interior (the indoor air), an indoor air humidity sensor 38 which detects a humidity of the air of the vehicle interior, an indoor air $CO_2$ concentration sensor 39 which detects a carbon dioxide concentration of the vehicle interior, an outlet temperature sensor 41 which detects a temperature of the air blown out from the outlet 29 to the vehicle interior, a discharge pressure sensor 42 which detects a pressure of the refrigerant discharged from the compressor 2, a discharge temperature sensor 43 which detects a temperature of the refrigerant discharged from the compressor 2, a suction pressure sensor 44 which detects a suction refrigerant pressure of the compressor 2, a radiator temperature sensor 46 which detects a temperature of the radiator 4 (the temperature of the air passed through the radiator 4 or the temperature of the radiator 4 itself), a radiator pressure sensor 47 which detects a refrigerant pressure of the radiator 4 (the pressure in the radiator 4 or of the refrigerant which has just flowed out from the radiator 4), a heat absorber temperature sensor 48 which detects a temperature of the heat absorber 9 (the temperature of the air passed through the heat absorber 9 or the temperature of the heat absorber 9 itself), a heat absorber pressure sensor 49 which detects a refrigerant pressure of the heat absorber 9 (the pressure in the heat absorber 9 or of the refrigerant which has just flowed out from the heat absorber 9), a solar radiation sensor 51 of, e.g., a photo sensor system to detect a solar radiation amount into the vehicle, a velocity sensor 52 to detect a moving speed (a velocity) of the vehicle, an air conditioning operating portion 53 to set the changing of a predetermined temperature or the operation mode, an outdoor heat exchanger temperature sensor 54 which detects a temperature of the outdoor heat exchanger 7 (the temperature of the refrigerant which has just flowed out from the outdoor heat exchanger 7 or the temperature of the outdoor heat exchanger 7 itself), and an outdoor heat exchanger pressure sensor 56 which detects the refrigerant pressure of the outdoor heat exchanger 7 (the pressure in the outdoor heat exchanger 7 or of the refrigerant which has just flowed out from the outdoor heat exchanger 7).

Furthermore, the input of the controller 32 is further connected to respective outputs of a heating medium heating electric heater temperature sensor 50 which detects a temperature of the heating medium heating electric heater 35 of the heating medium circulating circuit 23 (the temperature of the heating medium which has just been heated by the heating medium heating electric heater 35, or the temperature of an unshown electric heater itself disposed in the heating medium heating electric heater 35), and a heating medium-air heat exchanger temperature sensor 55 which detects a temperature of the heating medium-air heat exchanger 40 (the temperature of the air flowing through the heating medium-air heat exchanger 40, or the temperature of the heating medium-air heat exchanger 40 itself).

On the other hand, an output of the controller 32 is connected to the compressor 2, the outdoor blower 15, the indoor blower (the blower fan) 27, the suction changing damper 26, the air mix damper 28, the outlet changing damper 31, the outdoor expansion valve 6, the indoor expansion valve 8, respective solenoid valves such as the solenoid valve 22 (dehumidifying), the solenoid valve 17 (cooling), the solenoid valve 21 (heating) and the solenoid valve 20 (bypass), the circulating pump 30, the heating medium heating electric heater 35, and the evaporation capability control valve 11. Then, the controller 32 controls these components on the basis of the outputs of the respective sensors and the setting input by the air conditioning operating portion 53. It is to be noted that reference numeral 61 is a display disposed in the air conditioning operating portion 53, and the display constitutes display means of various pieces of information on operations and running, and additionally constitutes alarm means for displaying information of disconnection failure described later or the like.

Here, each of the respective solenoid valves 17, 20, 21 and 22 mentioned above has a coil, and the coil is energized to control opening/closing, but the solenoid valve 17 for cooling and the solenoid valve 20 for bypass are so-called normally open type (NO) solenoid valves which close when the coils are energized and open when the coils are non-energized, and the solenoid valve 21 for heating and the solenoid valve 22 for dehumidifying are so-called normally closed type (NC) solenoid valves which open during the energization and close during the non-energization.

Consequently, in a state where a power source is disconnected as described later in detail, an annular refrigerant circuit (a cooling mode which will be described later) is constituted to communicate with the compressor 2 (a discharge side), the radiator 4, the solenoid valve 20 (bypass), the outdoor heat exchanger 7, the solenoid valve 17 (cooling), the receiver drier portion 14, the subcooling portion 16, the check valve 18, the internal heat exchanger 19, the indoor expansion valve 8, the heat absorber 9, the evaporation capability control valve 11, the internal heat exchanger 19, the accumulator 12, and the compressor 2 (a suction side).

Next, an operation of the vehicle air conditioner device 1 of the embodiment having the above-mentioned constitution will be described. The controller 32 changes and executes respective operation modes roughly divided into a heating mode, a dehumidifying and heating mode, an internal cycle mode, a dehumidifying and cooling mode, and a cooling mode. Here, each of the dehumidifying and heating mode, the internal cycle mode and the dehumidifying and cooling mode is included in the dehumidifying mode of the present invention.

First, a flow of the refrigerant in each operation mode will be described with reference to FIG. 3 which explains an opened/closed state of each of the solenoid valves 17, 20, 21 and 22.

(1) Flow of Refrigerant of Heating Mode

When the heating mode is selected by the controller 32 or a manual operation to the air conditioning operating portion 53, the controller 32 energizes the solenoid valve 21 (for the heating) to open the solenoid valve 21 and energizes the solenoid valve 17 to close the solenoid valve 17. Furthermore, the controller adjusts the solenoid valve 22 to be non-energized, closes the solenoid valve 22, and energizes the solenoid valve 20 to close the solenoid valve 20.

Then, the controller operates the compressor 2 and the respective blowers 15 and 27, and the air mix damper 28 has a state of passing the air blown out from the indoor blower 27 through the heating medium-air heat exchanger 40 and the radiator 4. In consequence, a high-temperature high-pressure gas refrigerant discharged from the compressor 2 flows into the radiator 4. The air in the air flow passage 3 passes through the radiator 4, and hence the air in the air flow passage 3 heats by the high-temperature refrigerant in the radiator 4, whereas the refrigerant in the radiator 4 has the heat taken by the air and is cooled to condense and liquefy.

The refrigerant liquefied in the radiator 4 flows out from the radiator 4, and then flows through the refrigerant pipe 13E to reach the outdoor expansion valve 6. It is to be noted that an operation and a function of the heating medium circulating circuit 23 will be described later. The refrigerant flowing into the outdoor expansion valve 6 is decompressed therein and then flows into the outdoor heat exchanger 7. The refrigerant flowing into the outdoor heat exchanger 7 evaporates, and the heat is pumped up from the outdoor air passed by running or the outdoor blower 15. That is, the refrigerant circuit R becomes a heat pump. Then, the low-temperature refrigerant flowing out from the outdoor heat exchanger 7 flows through the refrigerant pipe 13A and the solenoid valve 21 and the refrigerant pipe 13D, and flows from the refrigerant pipe 13C into the accumulator 12 to perform gas liquid separation therein, and then the gas refrigerant is sucked into the compressor 2, thereby repeating this circulation. The air heated in the radiator 4 flows through the heating medium-air heat exchanger 40 and is blown out from the outlet 29, thereby performing the heating of the vehicle interior.

The controller 32 controls a number of revolution of the compressor 2 on the basis of a high pressure of the refrigerant circuit R which is detected by the discharge pressure sensor 42 or the radiator pressure sensor 47, also controls a valve position of the outdoor expansion valve 6 on the basis of a temperature of the radiator 4 which is detected by the radiator temperature sensor 46 and the refrigerant pressure of the radiator 4 which is detected by the radiator pressure sensor 47, and controls a subcool degree of the refrigerant in an outlet of the radiator 4.

(1-1) Effects of Solenoid Valve 21 for Heating and Solenoid Valve 22 for Dehumidifying which are NC Here, as described above, the solenoid valve 21 for heating and the solenoid valve 22 for dehumidifying are the normally closed type solenoid valves which close during the non-energization. Therefore, in a case of stopping the vehicle air conditioner device 1 in this heating mode, the solenoid valve 21 closes, and hence there is obstructed movement of the refrigerant and oil from the outdoor heat exchanger 7 to the accumulator 12 via the refrigerant pipes 13A, 13D and 13C.

Furthermore, even when stopping the vehicle air conditioner device 1 in the heating mode, the solenoid valve 22 for dehumidifying is not opened. In this heating mode, a large pressure difference is generated before and after the solenoid valve 22, but the solenoid valve 22 closes, and hence a noise to be generated in a case of opening is not generated.

(2) Flow of Refrigerant of Dehumidifying and Heating Mode

Next, in the dehumidifying and heating mode, the controller 32 energizes the solenoid valve 22 to open the solenoid valve 22 (for the dehumidifying) in the above state of the heating mode. In consequence, a part of the condensed refrigerant flowing through the radiator 4 and the refrigerant pipe 13E is distributed, and flows through the solenoid valve 22 to flow from the refrigerant pipes 13F and 13B through the internal heat exchanger 19, thereby reaching the indoor expansion valve 8. The refrigerant is decompressed in the indoor expansion valve 8 and then flows into the heat absorber 9 to evaporate. Water in the air blown out from the indoor blower 27 coagulates to adhere to the heat absorber 9 by a heat absorbing operation at this time, and hence the air is cooled and dehumidified.

The refrigerant evaporated in the heat absorber 9 flows through the evaporation capability control valve 11 and the internal heat exchanger 19 to join the refrigerant from the refrigerant pipe 13D in the refrigerant pipe 13C, and then flows through the accumulator 12 to be sucked into the compressor 2, thereby repeating this circulation. The air dehumidified in the heat absorber 9 is reheated in a process of passing the radiator 4, thereby performing the dehumidifying and heating of the vehicle interior. The controller 32 controls the number of revolution of the compressor 2 on the basis of the high pressure of the refrigerant circuit R which is detected by the discharge pressure sensor 42 or the radiator pressure sensor 47, and also controls the valve position of the outdoor expansion valve 6 on the basis of the temperature of the heat absorber 9 which is detected by the heat absorber temperature sensor 48.

(3) Flow of Refrigerant of Internal Cycle Mode

Next, in the internal cycle mode, the controller 32 shuts off the outdoor expansion valve 6 in the above state of the dehumidifying and heating mode (a shut off position), and also adjusts the solenoid valve 21 (for the heating) to be non-energized to close the solenoid valve 21. When the outdoor expansion valve 6 and the solenoid valve 21 close (the solenoid valve 20 also closes), inflow of the refrigerant into the outdoor heat exchanger 7 and outflow of the refrigerant from the outdoor heat exchanger 7 are obstructed, and hence all the condensed refrigerant flowing through the radiator 4 and the refrigerant pipe 13E flows through the solenoid valve 22 to the refrigerant pipe 13F. Then, the refrigerant flowing through the refrigerant pipe 13F flows from the refrigerant pipe 13B through the internal heat exchanger 19 to reach the indoor expansion valve 8. The refrigerant is decompressed in the indoor expansion valve 8 and then flows into the heat absorber 9 to evaporate. The water in the air blown out from the indoor blower 27 coagulates to adhere to the heat absorber 9 by the heat absorbing operation at this time, and hence the air is cooled and dehumidified.

The refrigerant evaporated in the heat absorber 9 flows through the evaporation capability control valve 11, the internal heat exchanger 19, the refrigerant pipe 13C and the accumulator 12 to be sucked into the compressor 2, thereby repeating this circulation. The air dehumidified in the heat absorber 9 is reheated in the process of passing the radiator 4, thereby performing the dehumidifying and heating of the vehicle interior, but in this internal cycle mode, the refrigerant circulates between the radiator 4 (heat radiation) and the heat absorber 9 (heat absorption) which are present in the air flow passage 3 on an indoor side, and hence the heat is not pumped up from the outdoor air, but a heating capability for a consumed power of the compressor 2 is exerted. The whole amount of the refrigerant flows through the heat absorber 9 which exerts a dehumidifying operation, and hence as compared with the above dehumidifying and heating mode, a dehumidifying capability is higher, but the heating capability lowers.

The controller 32 controls the number of revolution of the compressor 2 on the basis of the temperature of the heat absorber 9 or the above-mentioned high pressure of the refrigerant circuit R. At this time, the controller 32 selects a smaller compressor target number of revolution from compressor target numbers of revolution obtainable by calculations from the temperature of the heat absorber 9 or the high pressure, to control the compressor 2.

(4) Flow of Refrigerant of Dehumidifying and Cooling Mode

Next, in the dehumidifying and cooling mode, the controller 32 adjusts the solenoid valve 17 (for the cooling) to be non-energized to open the solenoid valve 17 and adjusts the solenoid valve 21 to be non-energized to close the solenoid valve 21. Furthermore, the controller adjusts the solenoid valve 22 to be non-energized to close the solenoid valve 22 and energizes the solenoid valve 20 to close the solenoid valve 20. Then, the controller operates the compressor 2 and the respective blowers 15 and 27, and the air mix damper 28 has the state of passing the air blown out from the indoor blower 27 through the heating medium-air heat exchanger 40 and the radiator 4. In consequence, the high-temperature high-pressure gas refrigerant discharged from the compressor 2 flows into the radiator 4. Through the radiator 4, the air in the air flow passage 3 passes, and hence the air in the air flow passage 3 heats by the high-temperature refrigerant in the radiator 4, whereas the refrigerant in the radiator 4 has the heat taken by the air and is cooled to condense and liquefy.

The refrigerant flowing out from the radiator 4 flows through the refrigerant pipe 13E to reach the outdoor expansion valve 6, and flows through the outdoor expansion valve 6 controlled so that the valve tends to be open, to flow into the outdoor heat exchanger 7. The refrigerant flowing into the outdoor heat exchanger 7 is cooled by the running therein or the outdoor air passed through the outdoor blower 15, to condense. The refrigerant flowing out from the outdoor heat exchanger 7 flows from the refrigerant pipe 13A through the solenoid valve 17 to successively flow into the receiver drier portion 14 and the subcooling portion 16. Here, the refrigerant is subcooled.

The refrigerant flowing out from the subcooling portion 16 of the outdoor heat exchanger 7 flows through the check valve 18 to enter the refrigerant pipe 13B, and flows through the internal heat exchanger 19 to reach the indoor expansion valve 8. The refrigerant is decompressed in the indoor expansion valve 8 and then flows into the heat absorber 9 to evaporate. The water in the air blown out from the indoor blower 27 coagulates to adhere to the heat absorber 9 by the heat absorbing operation at this time, and hence the air is cooled and dehumidified.

The refrigerant evaporated in the heat absorber 9 flows through the evaporation capability control valve 11, the internal heat exchanger 19 and the refrigerant pipe 13C to reach the accumulator 12, and flows therethrough to be sucked into the compressor 2, thereby repeating this circulation. The air cooled and dehumidified in the heat absorber 9 is reheated in the process of passing the radiator 4 (a radiation capability is lower than that during the heating), thereby performing the dehumidifying and cooling of the vehicle interior. The controller 32 controls the number of revolution of the compressor 2 on the basis of the temperature of the heat absorber 9 which is detected by the heat absorber temperature sensor 48, also controls the valve position of the outdoor expansion valve 6 on the basis of the above-mentioned high pressure of the refrigerant circuit R, and controls a refrigerant pressure (a radiator pressure Pci) of the radiator 4.

(5) Flow of Refrigerant of Cooling Mode

Next, in the cooling mode, the controller 32 adjusts the solenoid valve 20 (bypass) to be non-energized to open the solenoid valve 20 in the above state of the dehumidifying and cooling mode (in this case, the outdoor expansion valve 6 may have any valve position including full open (the valve position is an upper limit of controlling)), and the air mix damper 28 has a state where the air does not pass through the heating medium-air heat exchanger 40 and the radiator 4. However, the air may slightly passes. That is, in this cooling mode, all the solenoid valves 17, 20, 21 and 22 are non-energized.

In consequence, the high-temperature high-pressure gas refrigerant discharged from the compressor 2 flows into the radiator 4. The air in the air flow passage 3 does not pass through the radiator 4, the refrigerant therefore only passes the radiator, and the refrigerant flowing out from the radiator 4 flows through the refrigerant pipe 13E to reach the solenoid valve 20 and the outdoor expansion valve 6. At this time, the solenoid valve 20 is open, and hence the refrigerant bypasses the outdoor expansion valve 6 to pass the bypass pipe 13J, and flows into the outdoor heat exchanger 7 as it is, in which the refrigerant is cooled by the running therein or the outdoor air passing through the outdoor blower 15, to condense and liquefy. The refrigerant flowing out from the outdoor heat exchanger 7 flows from the refrigerant pipe 13A through the solenoid valve 17 to successively flow into the receiver drier portion 14 and the subcooling portion 16. Here, the refrigerant is subcooled.

The refrigerant flowing out from the subcooling portion 16 of the outdoor heat exchanger 7 flows through the check valve 18 to enter the refrigerant pipe 13B, and flows through the internal heat exchanger 19 to reach the indoor expansion valve 8. The refrigerant is decompressed in the indoor expansion valve 8 and then flows into the heat absorber 9 to evaporate. Water in the air blown out from the indoor blower 27 coagulates to adhere to the heat absorber 9 by the heat absorbing operation at this time, and hence the air is cooled.

The refrigerant evaporated in the heat absorber 9 flows through the evaporation capability control valve 11, the internal heat exchanger 19 and the refrigerant pipe 13C to reach the accumulator 12, and flows therethrough to be sucked into the compressor 2, thereby repeating this circulation. The air cooled and dehumidified in the heat absorber 9 does not pass the radiator 4 but is blown out from the outlet 29 to the vehicle interior (the air may slightly pass), thereby performing cooling of the vehicle interior. In this cooling mode, the controller 32 controls the number of revolution of the compressor 2 on the basis of the temperature of the heat absorber 9 which is detected by the heat absorber temperature sensor 48.

(6) Changing of Operation Mode

On startup, the controller 32 selects one of the above respective operation modes on the basis of the outdoor air temperature Tam detected by the outdoor air temperature sensor 33 and a target outlet temperature TAO. Then, after the startup, the controller selects and changes each operation mode described above in accordance with changes of environments of the outdoor air temperature Tam, the target outlet temperature TAO and the like and setting conditions.

(7) Auxiliary Heating by Heating Medium Circulating Circuit in Heating Mode

Furthermore, in a case of judging that the heating capability by the radiator 4 runs short in the above heating mode, the controller 32 energizes the heating medium heating electric heater 35 to generate heat, and operates the circulating pump 30, thereby executing heating by the heating medium-air heat exchanger 40 of the heating medium circulating circuit 23.

When the circulating pump 30 of the heating medium circulating circuit 23 is operated and the heating medium heating electric heater 35 is energized, the heating medium (a high-temperature heating medium) heated by the heating medium heating electric heater 35 as described above circulates through the heating medium-air heat exchanger 40, and hence the air flowing into the radiator 4 of the air flow passage 3 heats. Consequently, in a case where the heating capability generable in the radiator 4 runs short to the heating capability required in the heating mode, the heating medium circulating circuit 23 complements the heating capability for the shortage.

(8) Control in Case where Disconnection Failure Occurs in Solenoid Valve

Next, there will be described an operation of the controller 32 in a case where one, several or all of the coils in the respective solenoid valves 17, 20, 21 and 22 constituting the refrigerant circuit R is disconnected. It is to be noted that the controller 32 always electrically monitors whether or not the coils of the respective solenoid valves 17, 20, 21 and 22 are disconnected. Here, a method of detecting the disconnection of the coils is a heretofore well-known method, and hence the description is omitted.

Then, in a case of judging that the coil of one of the solenoid valves 17, 20, 21 and 22 is disconnected, the controller 32 first performs alarm display to the effect that such a failure occurs, in the display 61 of the air conditioning operating portion 53, and prompts a user for rapid repair. Next, the controller executes an operation mode during failure as follows in accordance with a presently executed operation mode or a selected operation mode.

(8-1) Cooling Mode During Failure

In a case of detecting the disconnection failure of one of the solenoid valves when executing, for example, the above-mentioned cooling mode, the controller 32 executes a cooling mode during failure in which the controller continuously adjusts all the solenoid valves 17, 20, 21 and 22 into a non-energized state to operate the compressor 2. Control of the compressor 2 and control of another apparatus is similar to those of the above-mentioned cooling mode. Consequently, the vehicle interior is continuously cooled.

(8-2) Dehumidifying Mode During Failure

Next, in a case of detecting the disconnection failure of one of the solenoid valves when executing one of the above-mentioned dehumidifying and heating mode, internal cycle mode and dehumidifying and cooling mode, the controller 32 adjusts all the solenoid valves 17, 20, 21 and 22 into the non-energized state to operate the compressor 2. Consequently, the flow of the refrigerant of the refrigerant circuit R changes to a state of the above-mentioned cooling mode.

The air mix damper 28 continuously has a state of passing the air blown out from the indoor blower 27 through the heating medium-air heat exchanger 40 and the radiator 4. Furthermore, the vehicle air conditioner device executes a dehumidifying mode during failure in which the controller 32 energizes the heating medium heating electric heater 35 to generate heat, and operates the circulating pump 30, thereby performing heating by the heating medium-air heat exchanger 40 of the heating medium circulating circuit 23.

When the flow of the refrigerant of the refrigerant circuit R changes to the cooling mode, the heat absorbing operation occurs in the heat absorber 9 as described above, and hence water in the air blown out from the indoor blower 27 coagulates to adhere to the heat absorber 9. Consequently, the air is cooled and dehumidified. On the other hand, when the circulating pump 30 of the heating medium circulating circuit 23 is operated and the heating medium heating electric heater 35 is energized, the heating medium (the high-temperature heating medium) heated by the heating medium heating electric heater 35 circulates through the heating medium-air heat exchanger 40 as described above, and hence the air flowing into the radiator 4 of the air flow passage 3 heats.

In consequence, the air dehumidified in the heat absorber 9 is reheated in a process of passing the heating medium-air heat exchanger 40, and hence the dehumidifying of the vehicle interior is performed. In accordance with whether the operation mode to be executed when the failure does not occur is the above-mentioned dehumidifying and heating mode, internal cycle or dehumidifying and cooling (each of which is the dehumidifying mode), the controller 32 controls the compressor 2 and the heating medium heating electric heater 35 to achieve the satisfying air conditioning operation.

That is, the refrigerant circuit R is in the cooling mode, and hence the controller 32 controls the number of revolution of the compressor 2 on the basis of the temperature of the heat absorber 9 in the same manner as during the above-mentioned cooling. The controller 32 performs energization control of the heating medium heating electric heater 35 of the heating medium circulating circuit 23 on the basis of the target outlet temperature TAO. That is, the controller calculates a required heating capability of the heating medium circulating circuit 23 from the target outlet temperature TAO, and performs control to increase a heating value of the heating medium heating electric heater 35 in a case of performing the dehumidifying and heating and to conversely decrease the heating value in a case of performing the dehumidifying and cooling. Consequently, it is possible to continuously perform the dehumidifying and heating/the dehumidifying and cooling (the dehumidifying) of the vehicle interior.

(8-3) Heating Mode During Failure

Next, in a case of detecting the disconnection failure of one of the solenoid valves when executing the above-mentioned heating mode, the controller 32 stops the compressor 2. The air mix damper 28 continuously has the state of passing the air blown out from the indoor blower 27 through the heating medium-air heat exchanger 40 and the radiator 4. Furthermore, the vehicle air conditioner device executes a heating mode during failure in which the controller 32 energizes the heating medium heating electric heater 35 to generate heat, and operates the circulating pump 30, thereby performing the heating by the heating medium-air heat exchanger 40 of the heating medium circulating circuit 23.

When the circulating pump 30 of the heating medium circulating circuit 23 is operated and the heating medium heating electric heater 35 is energized, the heating medium (the high-temperature heating medium) heated by the heating medium heating electric heater 35 circulates through the heating medium-air heat exchanger 40 as described above, and hence the air flowing into the radiator 4 of the air flow passage 3 heats.

In consequence, the air blown out to the vehicle interior heats in a process of passing the heating medium-air heat exchanger 40, and hence the heating of the vehicle interior is performed. Also in this case, the controller 32 calculates the required heating capability of the heating medium circulating circuit 23 (the heating medium-air heat exchanger 40) from the target outlet temperature TAO, and controls the energization of the heating medium heating electric heater 35. Consequently, it is possible to continuously perform the heating of the vehicle interior.

As described above, the respective solenoid valves 17, 20, 21 and 22 of the vehicle air conditioner device 1 are constituted so that the flow of the refrigerant of the refrigerant circuit R changes to the cooling mode when all the solenoid valves 17, 20, 21 and 22 are non-energized, and hence in the cooling mode to be executed in an environment where durability of the coils of the solenoid valves 17, 20, 21 and 22 is feared, i.e., in a high outdoor air temperature environment such as summer where an ambient temperature of the solenoid valves 17, 20, 21 and 22 rises, the respective solenoid valves 17, 20, 21 and 22 are non-energized. Consequently, it is possible to inhibit the disadvantage that the solenoid valves 17, 20, 21 and 22 deteriorate due to temperature rise accompanying heat generation of the coils and to improve reliability.

Especially, the vehicle air conditioner device executes the cooling mode during failure in which the controller 32 adjusts all the solenoid valves 17, 20, 21 and 22 to be non-energized and operates the compressor 2, in the case where the disconnection failure occurs in one of the solenoid valves 17, 20, 21 and 22. Therefore, also in the case where the disconnection failure occurs in one of the solenoid valves 17, 20, 21 and 22, it is possible to continue the air conditioning operation (the cooling mode during failure) in which the controller changes the flow of the refrigerant to the cooling mode and operates the compressor 2, thereby cooling the vehicle interior, and it is possible to achieve such comfortable vehicle interior cooling during the failure.

Furthermore, the vehicle air conditioner device executes the dehumidifying mode during failure in which the controller 32 adjusts all the solenoid valves 17, 20, 21 and 22 to be non-energized, operates the compressor 2, and generates heat in the heating medium-air heat exchanger 40 of the heating medium circulating circuit 23 to heat the air to be supplied to the vehicle interior, in the case where the disconnection failure occurs in one of the solenoid valves 17, 20, 21 and 22. Therefore, also in the case where the disconnection failure occurs in one of the solenoid valves 17, 20, 21 and 22, it is possible to continue the air conditioning operation (the dehumidifying mode during failure) in which the controller changes the flow of the refrigerant to the cooling mode to operate the compressor 2, lets the refrigerant absorb heat in the heat absorber 9 and heats the air to be supplied to the vehicle interior by the heating medium-air heat exchanger 40 of the heating medium circulating circuit 23, thereby dehumidifying the vehicle interior, and it is possible to achieve such comfortable vehicle interior dehumidifying during the failure.

Furthermore, the vehicle air conditioner device executes the heating mode during failure in which the controller 32 stops the operation of the compressor 2 to heat the air to be supplied to the vehicle interior by heat generation of the heating medium-air heat exchanger 40 of the heating medium circulating circuit 23, in the case where the disconnection failure occurs in one of the solenoid valves 17, 20, 21 and 22. Therefore, also in the case where the disconnection failure occurs in one of the solenoid valves 17, 20, 21 and 22, it is possible to continue an air conditioning operation (the heating mode during failure) in which the controller stops the operation of the compressor 2 and additionally heats the air to be supplied to the vehicle interior with the heating medium-air heat exchanger 40 of the heating medium circulating circuit 23, thereby heating the vehicle interior, and it is possible to achieve such comfortable vehicle interior heating during the failure.

The solenoid valve 21 for heating positioned between the outlet of the outdoor heat exchanger 7 and the inlet of the accumulator 12 is the normally closed type solenoid valve which closes in the non-energized state, and hence while the vehicle air conditioner device 1 stops, the solenoid valve 21 for heating inhibits the refrigerant or oil from moving from the outdoor heat exchanger 7 to the accumulator 12, and reliability on re-startup can improve.

Furthermore, the solenoid valve 22 for dehumidifying which is connected in parallel with the outdoor heat exchanger 7 is the normally closed type solenoid valve which closes in the non-energized state, and hence when the vehicle air conditioner device 1 executing the heating mode stops, the solenoid valve 22 for dehumidifying does not open. In the heating mode, a pressure difference before and after the solenoid valve 22 for dehumidifying increases, but the solenoid valve 22 for dehumidifying is prevented from opening during the stop, so that it is possible to avoid, in advance, the disadvantage that noise is generated in the solenoid valve 22 for dehumidifying when the vehicle air conditioner device 1 stops.

Furthermore, there is provided the heating medium circulating circuit 23 which has the heating medium-air heat exchanger 40, the electric heater 35 and the circulating pump 30 and circulates the heating medium heated by the electric heater 35 through the heating medium-air heat exchanger 40 by the circulating pump 30, and the auxiliary heating means is constituted of the heating medium-air heat exchanger 40, so that it is possible to achieve electrically safe vehicle interior heating.

(9) Another Constitutional Example 1

Figure 4:
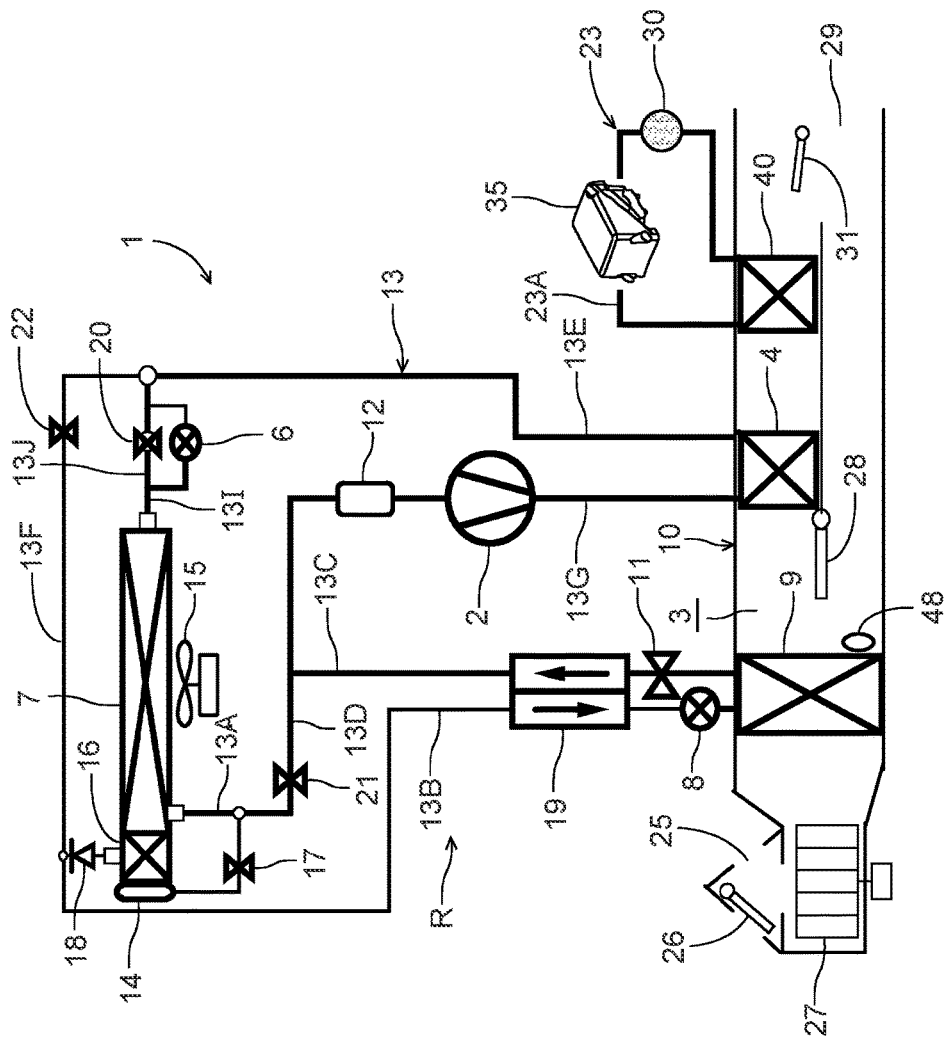
FIG. 4 is a constitutional view of a vehicle air conditioner device of another embodiment to which the present invention is applied.

Next, FIG. 4 shows another constitutional view of the vehicle air conditioner device 1 of the present invention. In this embodiment, a heating medium-air heat exchanger 40 of a heating medium circulating circuit 23 is disposed on an air downstream side of a radiator 4. Another constitution is similar to the example of FIG. 1. The present invention is also effective in the vehicle air conditioner device 1 in which the heating medium-air heat exchanger 40 is disposed on the downstream side of the radiator 4 in this manner.

(10) Another Constitutional Example 2

Figure 5:
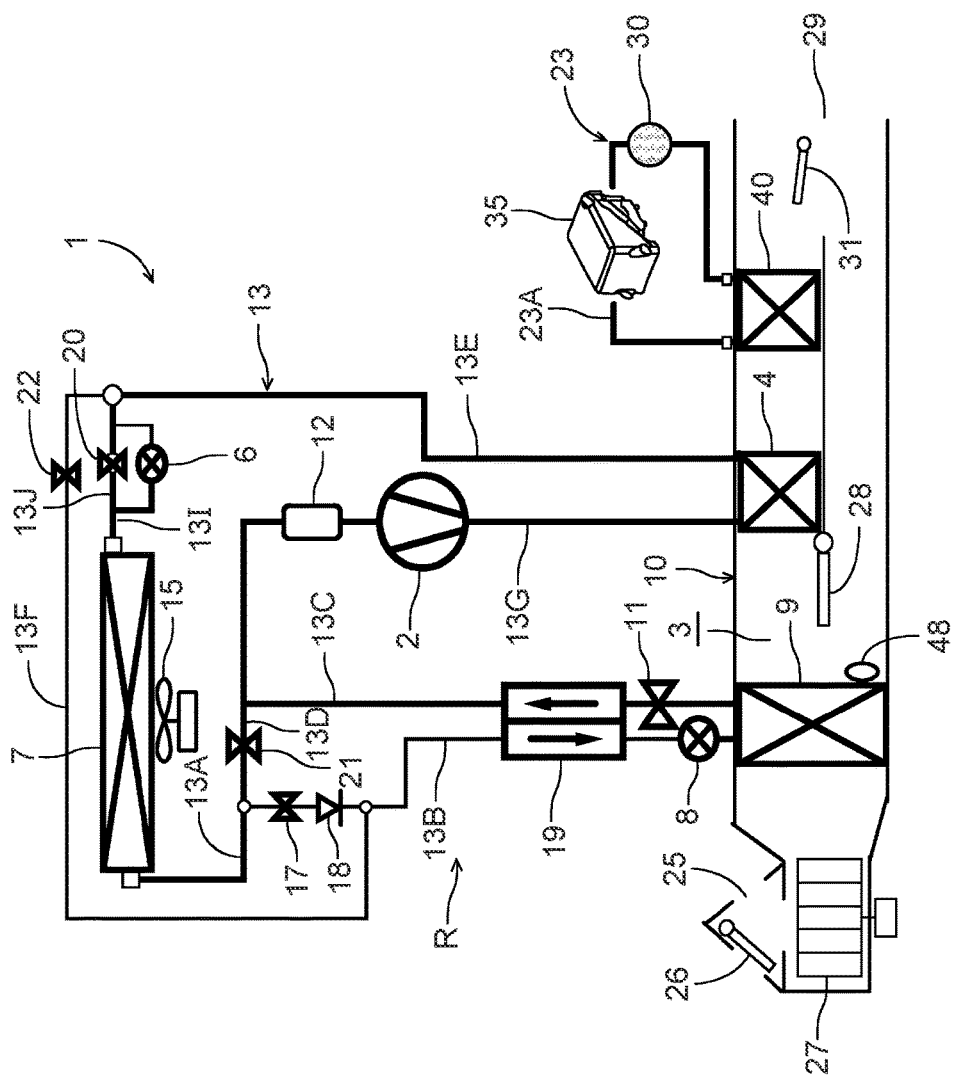
FIG. 5 is a constitutional view of a vehicle air conditioner device of still another embodiment to which the present invention is applied.

Next, FIG. 5 shows still another constitutional view of the vehicle air conditioner device 1 of the present invention. In this embodiment, an outdoor heat exchanger 7 is not provided with a receiver drier portion 14 and a subcooling portion 16, and a refrigerant pipe 13A extending out from the outdoor heat exchanger 7 is connected to a refrigerant pipe 13B via a solenoid valve 17 and a check valve 18. Furthermore, a refrigerant pipe 13D branching from the refrigerant pipe 13A is similarly connected to a refrigerant pipe 13C on a downstream side of an internal heat exchanger 19 via a solenoid valve 21.

Another constitution is similar to the example of FIG. 4. The present invention is also effective in the vehicle air conditioner device 1 of a refrigerant circuit R employing the outdoor heat exchanger 7 which does not have the receiver drier portion 14 and the subcooling portion 16 in this manner.

(11) Another Constitutional Example 3

Figure 6:
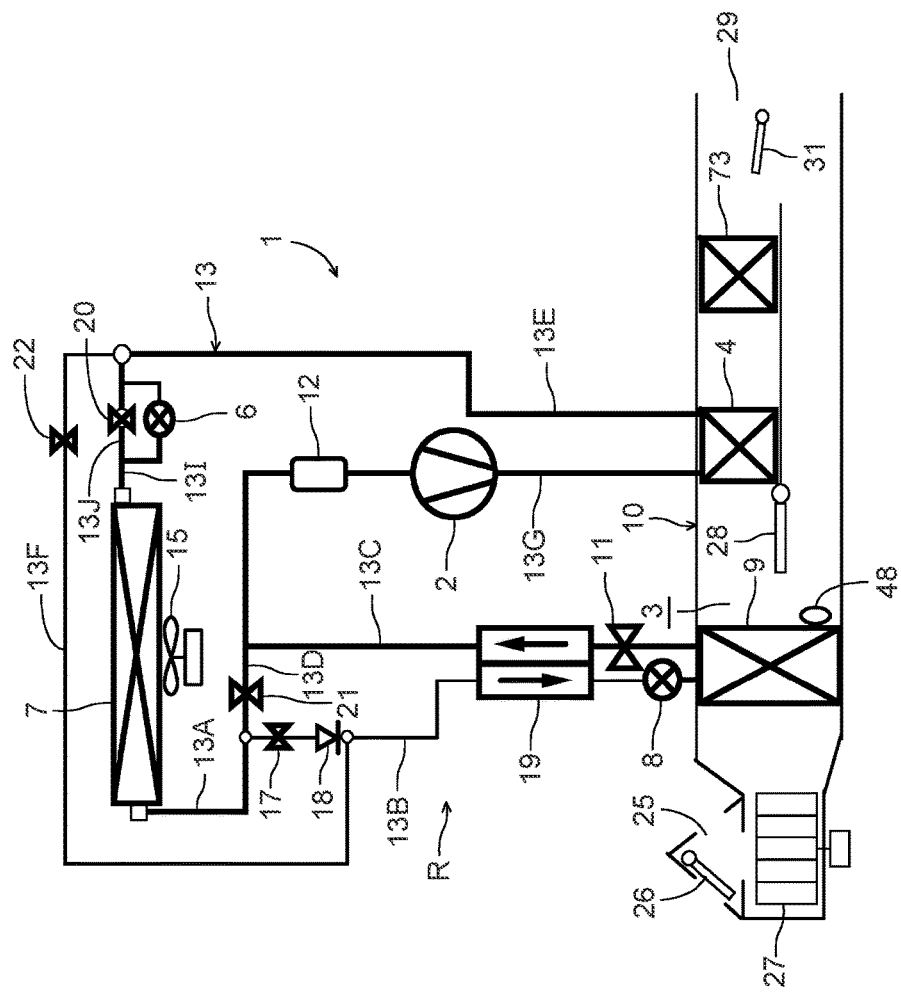
FIG. 6 is a constitutional view of a vehicle air conditioner device of a further embodiment to which the present invention is applied.

Next, FIG. 6 shows a further constitutional view of the vehicle air conditioner device 1 of the present invention. In this case, the heating medium circulating circuit 23 of FIG. 5 is replaced with an electric heater 73. In the above-mentioned case of the heating medium circulating circuit 23, the heating medium heating electric heater 35 is provided outside a vehicle interior of an air flow passage 3, and hence an electric safety is acquired, but the constitution becomes complicated.

On the other hand, when the electric heater 73 is provided in the air flow passage 3 as in FIG. 6, the constitution is remarkably simplified. In this case, the electric heater 73 constitutes auxiliary heating means to perform the above-mentioned control by a controller 32. Furthermore, the present invention is also effective in the vehicle air conditioner device 1 of a refrigerant circuit R in which the electric heater 73 is employed in this manner.

(12) Another Constitutional Example 4

Figure 7:
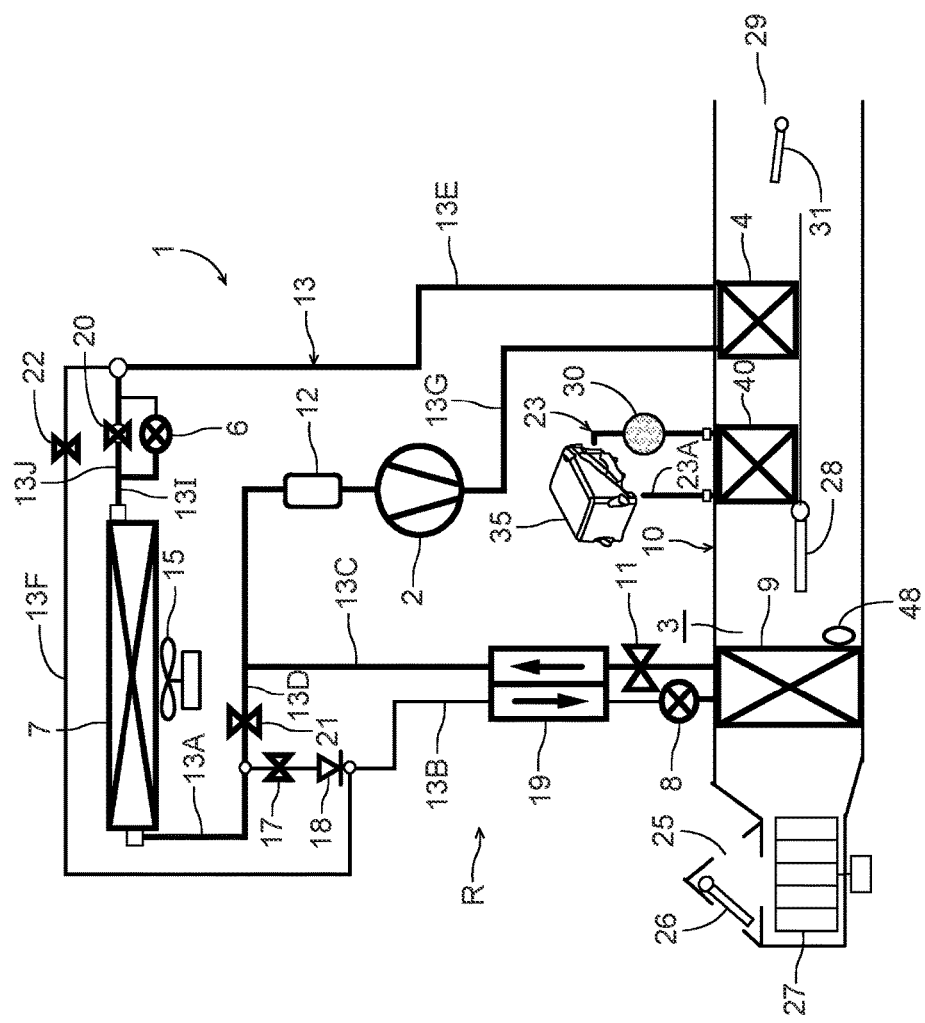
FIG. 7 is a constitutional view of a vehicle air conditioner device of a further embodiment to which the present invention is applied.

Next, FIG. 7 shows a further constitutional view of the vehicle air conditioner device 1 of the present invention. In this embodiment, a receiver drier portion 14 and a subcooling portion 16 are not provided in an outdoor heat exchanger 7 as compared with FIG. 1, and a refrigerant pipe 13A extending out from the outdoor heat exchanger 7 is connected to a refrigerant pipe 13B via a solenoid valve 17 and a check valve 18. Furthermore, a refrigerant pipe 13D branching from the refrigerant pipe 13A is similarly connected to a refrigerant pipe 13C on a downstream side of an internal heat exchanger 19 via a solenoid valve 21.

Another constitution is similar to the example of FIG. 1. The present invention is also effective in the vehicle air conditioner device 1 of a refrigerant circuit R employing the outdoor heat exchanger 7 which does not have the receiver drier portion 14 and the subcooling portion 16 in this manner.

(13) Another Constitutional Example 5

Figure 8:
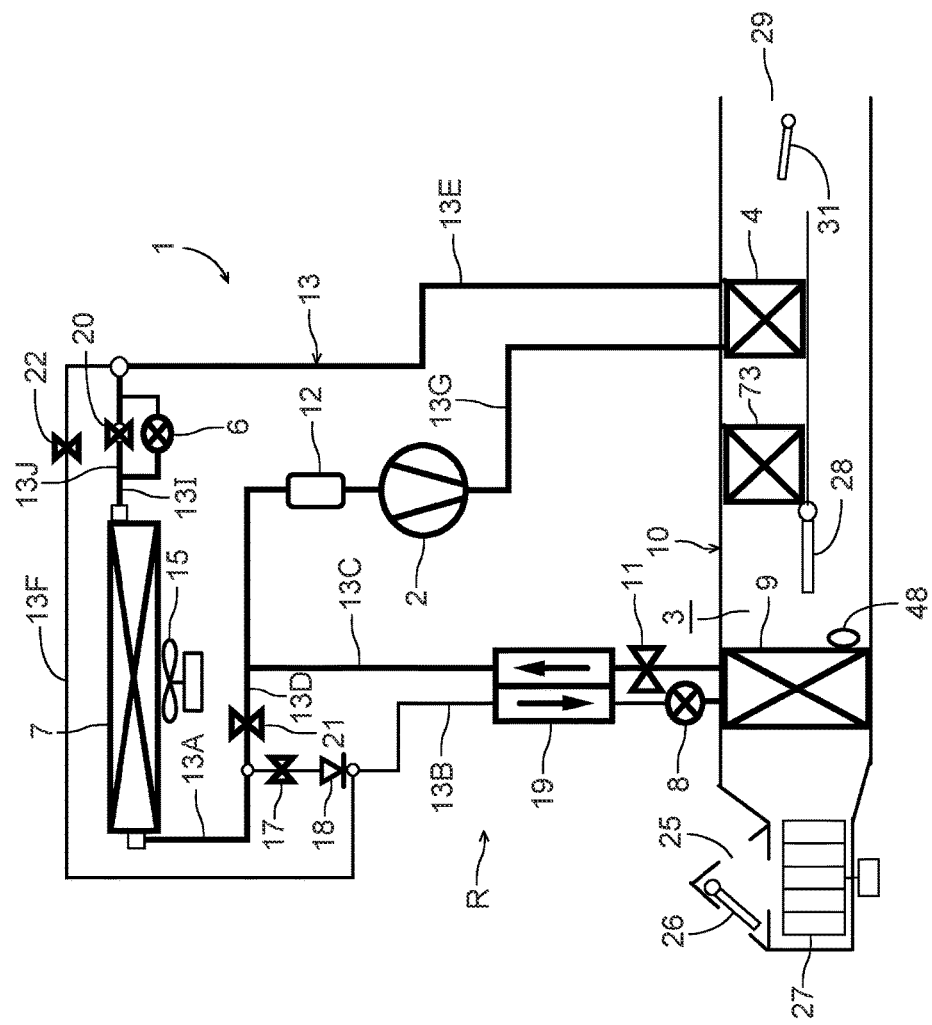
FIG. 8 is a constitutional view of a vehicle air conditioner device of a further embodiment to which the present invention is applied.

Next, FIG. 8 shows a further constitutional view of the vehicle air conditioner device 1 of the present invention. In this case, the heating medium circulating circuit 23 of FIG. 7 is replaced with an electric heater 73. The present invention is also effective in the vehicle air conditioner device 1 of a refrigerant circuit R in which the electric heater 73 is employed in this manner.

(14) Another Constitutional Example 6

Figure 9:
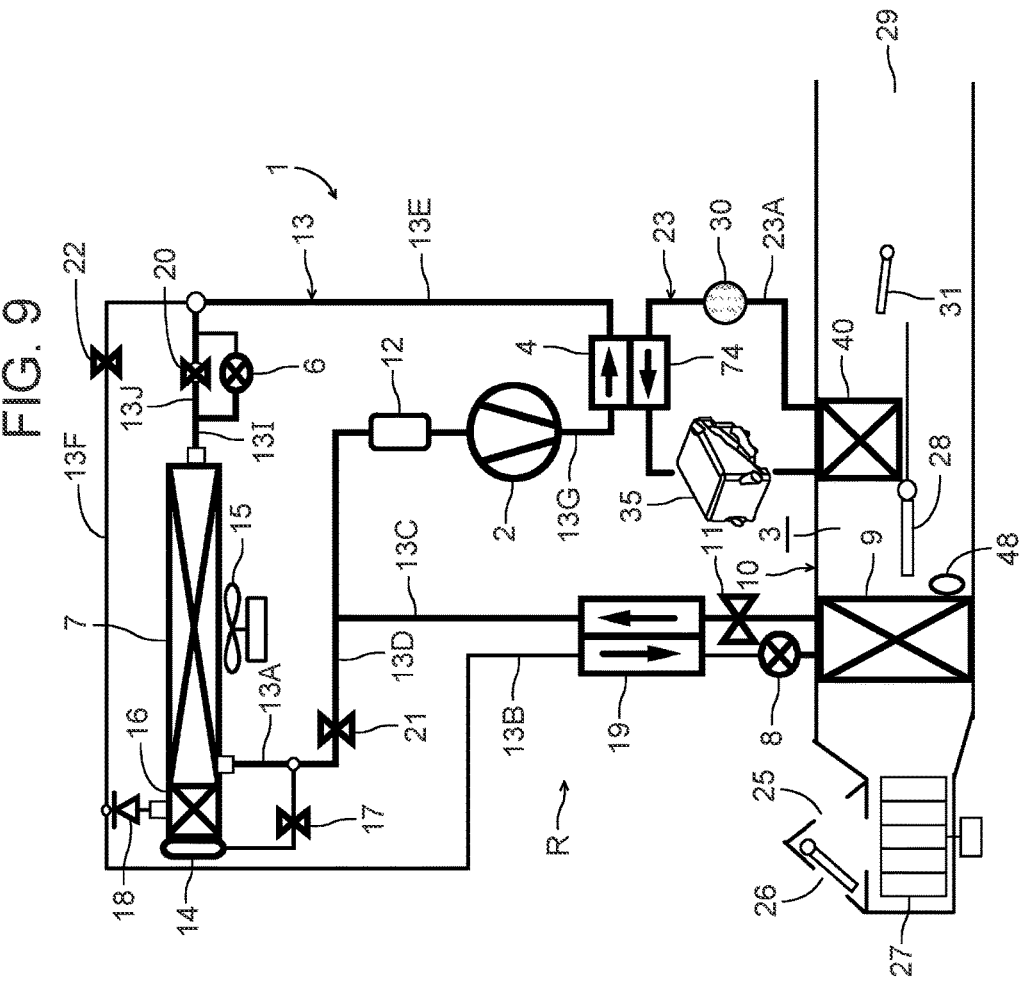
FIG. 9 is a constitutional view of a vehicle air conditioner device of a still further embodiment to which the present invention is applied.

Next, FIG. 9 shows a still further constitutional view of the vehicle air conditioner device 1 of the present invention. A pipe constitution of a refrigerant circuit R and a heating medium circulating circuit 23 in this embodiment is basically similar to the case of FIG. 1, but a radiator 4 is not provided in an air flow passage 3, and is disposed outside the air flow passage. Instead, a heating medium-refrigerant heat exchanger 74 of this case is disposed in a heat exchange relation in the radiator 4.

The heating medium-refrigerant heat exchanger 74 is connected to a heating medium pipe 23A between a circulating pump 30 of the heating medium circulating circuit 23 and a heating medium heating electric heater 35, and a heating medium-air heat exchanger 40 (auxiliary heating means) of the heating medium circulating circuit 23 is provided in the air flow passage 3. According to such a constitution, a heating medium discharged from the circulating pump 30 performs heat exchange with a refrigerant flowing through the radiator 4, heats by the refrigerant, is next heated by the heating medium heating electric heater 35 (in a case where the heater is energized to generate heat), and then radiates heat in the heating medium-air heat exchanger 40, thereby heating air to be supplied from the air flow passage 3 to a vehicle interior.

Also in a case where a heating capability by the radiator 4 runs short in the vehicle air conditioner device 1 of such a constitution, the heating medium heating electric heater 35 is energized to heat the heating medium flowing through the heating medium pipe 23A, thereby making it possible to perform auxiliary heating, and it is also possible to achieve the above-mentioned dehumidifying mode during failure and heating mode during failure. Furthermore, as compared with a case of disposing the above-mentioned electric heater in the air flow passage 3, electrically safer vehicle interior heating can be achieved.

It is to be noted that in the embodiments, the solenoid valve 21 and the solenoid valve 17 are constituted of separate solenoid valves, but may be constituted of an integrated three-way valve. In this case, there is used a three-way valve in which a side facing the receiver drier portion 14 in the non-energized state is opened and a side facing the refrigerant pipe 13C is closed.

Furthermore, in the embodiments, the present invention is applied to the vehicle air conditioner device 1 which changes and executes the respective operation modes of the heating mode, the dehumidifying and heating mode, the internal cycle mode, the dehumidifying and cooling mode and the cooling mode, but the present invention is not limited to these embodiments, and the present invention is also effective in a vehicle air conditioner device which performs only the dehumidifying and heating mode or only the dehumidifying and cooling mode as the dehumidifying mode.

Furthermore, needless to say, the constitution of the refrigerant circuit R described above in each embodiment is not limited to the embodiment, and is changeable without departing from the gist of the present invention.

DESCRIPTION OF REFERENCE NUMERALS 1 vehicle air conditioner device
2 compressor
3 air flow passage
4 radiator
6 outdoor expansion valve
7 outdoor heat exchanger
8 indoor expansion valve
9 heat absorber
11 evaporation capability control valve
17, 20, 21 and 22 solenoid valve
23 heating medium circulating circuit
26 suction changing damper
27 indoor blower (blower fan)
28 air mix damper
30 circulating pump (circulating means)
32 controller (control means)
35 heating medium heating electric heater (electric heater)
40 heating medium-air heat exchanger (auxiliary heating means)
74 heating medium-refrigerant heat exchanger
73 electric heater (auxiliary heating means)
R refrigerant circuit

The invention claimed is:
1. A vehicle air conditioner device comprising:
a compressor which compresses a refrigerant;
an air flow passage through which air to be supplied to a vehicle interior flows;

a radiator which lets the refrigerant radiate heat to heat the air to be supplied from the air flow passage to the vehicle interior;

a heat absorber which lets the refrigerant absorb heat to cool the air to be supplied from the air flow passage to the vehicle interior;

an outdoor heat exchanger disposed outside the vehicle interior to let the refrigerant radiate or absorb heat;

a plurality of solenoid valves to change a flow of the refrigerant;

auxiliary heating means for heating the air to be supplied from the air flow passage to the vehicle interior; and control means, the vehicle air conditioner device controlling the solenoid valves by the control means, thereby changing and executing at least a heating mode in which the control means lets the refrigerant discharged from the compressor radiate heat in the radiator, decompresses the refrigerant by which heat has been radiated, and then lets the refrigerant absorb heat in the outdoor heat exchanger, a dehumidifying mode in which the control means lets the refrigerant discharged from the compressor radiate heat in the radiator, decompresses the refrigerant by which heat has been radiated, and then lets the refrigerant absorb heat in the heat absorber, and a cooling mode in which the control means lets the refrigerant discharged from the compressor radiate heat in the outdoor heat exchanger, decompresses the refrigerant by which heat has been radiated, and then lets the refrigerant absorb heat in the heat absorber, wherein the respective solenoid valves are constituted so that the flow of the refrigerant changes to the cooling mode when all the solenoid valves are non-energized, the control means executes a cooling mode during failure in which the control means adjusts all the solenoid valves to be non-energized and operates the compressor, in a case where a disconnection failure occurs in one of the solenoid valves.

2. The vehicle air conditioner device according to claim 1, wherein the control means executes a dehumidifying mode during failure in which the control means adjusts all the solenoid valves to be non-energized, operates the compressor, and generates heat in the auxiliary heating means to heat the air to be supplied to the vehicle interior, in the case where the disconnection failure occurs in one of the solenoid valves.

3. The vehicle air conditioner device according to claim 1, wherein the control means executes a heating mode during failure in which the control means stops the operation of the compressor to heat the air to be supplied to the vehicle interior by heat generation of the auxiliary heating means, in the case where the disconnection failure occurs in one of the solenoid valves.

4. The vehicle air conditioner device according to claim 1, which comprises:

an accumulator disposed on a refrigerant suction side of the compressor; and the solenoid valve for heating which is positioned between an outlet of the outdoor heat exchanger and an inlet of the accumulator, wherein the solenoid valve for heating closes in a non-energized state.

5. The vehicle air conditioner device according to claim 1, which comprises the solenoid valve for dehumidifying which is connected in parallel with the outdoor heat exchanger, and the control means closes the solenoid valve for dehumidifying in the heating mode and the control means performs dehumidifying and heating by opening the solenoid valve for dehumidifying in the dehumidifying mode to let the refrigerant discharged from the compressor radiate heat in the radiator, decompresses the refrigerant by which heat has been radiated, and then lets the refrigerant absorb heat in the heat absorber and the outdoor heat exchanger, wherein the solenoid valve for dehumidifying closes in a non-energized state.

6. The vehicle air conditioner device according to claim 1, which comprises:

a heating medium circulating circuit which has a heating medium-air heat exchanger, an electric heater and circulating means and circulates a heating medium heated by the electric heater through the heating medium-air heat exchanger by the circulating means, wherein the auxiliary heating means is constituted of the heating medium-air heat exchanger.

7. The vehicle air conditioner device according to claim 1, wherein the auxiliary heating means is constituted of an electric heater.

8. The vehicle air conditioner device according to claim 1, wherein the radiator is disposed outside the air flow passage, and the auxiliary heating means is constituted of a heating medium circulating circuit which has a heating medium-refrigerant heat exchanger to perform heat exchange with the radiator, a heating medium-air heat exchanger disposed in the air flow passage, an electric heater and circulating means and circulates a heating medium heated by the heating medium-refrigerant heat exchanger and/or the electric heater through the heating medium-air heat exchanger by the circulating means.

* * * * *